US006204451B1

(12) United States Patent
Kato et al.

(10) Patent No.: US 6,204,451 B1
(45) Date of Patent: Mar. 20, 2001

(54) ELECTRICAL WIRING CONSTRUCTION INCLUDING A BUS BAR

(75) Inventors: Shinshu Kato, Yokkaichi; Shigeru Akoshima; Yasuhiro Kasahara, both of Toyota, all of (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/259,678

(22) Filed: Mar. 1, 1999

(30) Foreign Application Priority Data

Feb. 27, 1998 (JP) ..................................................... 10-047682

(51) Int. Cl.$^{7}$ ....................................................... H02G 5/10

(52) U.S. Cl. .................... 174/70 B; 174/71 B; 174/72 B; 174/99 B; 361/611; 361/624; 361/662

(58) Field of Search ................................ 174/70 B, 71 B, 174/72 B, 88 B, 99 B, 68.2, 149 B; 361/611, 627, 637, 640, 648, 662

(56) References Cited

U.S. PATENT DOCUMENTS

| | | | | |
|---|---|---|---|---|
| 2,569,223 | * | 9/1951 | Bowers | 173/324 |
| 3,035,242 | * | 5/1962 | Sloop | 339/19 |
| 3,076,167 | * | 1/1963 | Spencer et al. | 339/19 |
| 5,087,999 | * | 2/1992 | Sato et al. | 361/17 |
| 5,438,310 | | 8/1995 | Ikari | 337/208 |
| 5,749,671 | * | 5/1998 | Chauquet | 403/384 |

* cited by examiner

*Primary Examiner*—Kristine Kincaid
*Assistant Examiner*—W. David Walkenhorst
(74) *Attorney, Agent, or Firm*—Oliff & Berridge, PLC

(57) ABSTRACT

A bus bar is installed on a relay box accommodating relays. An exposed core wire at one end of an input line and an exposed core wire at one end of a bypassing line are crimped to a crimping portion of a first connection terminal. An exposed core wire at one end of an output line and an exposed core wire at the other end of the bypassing line are crimped to a crimping portion of a second connection terminal. The first and second connection terminals are connected with the bus bar by means of a respective screws tightened into the bus bar.

8 Claims, 4 Drawing Sheets

Fig. 1A
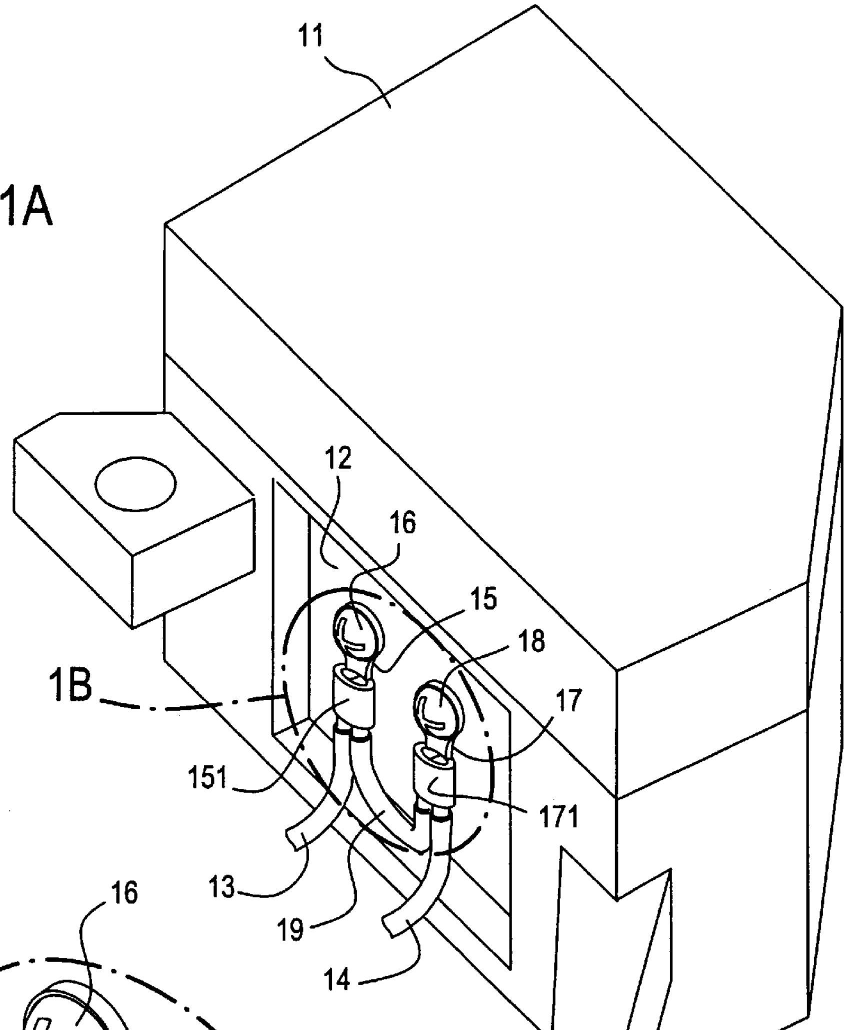
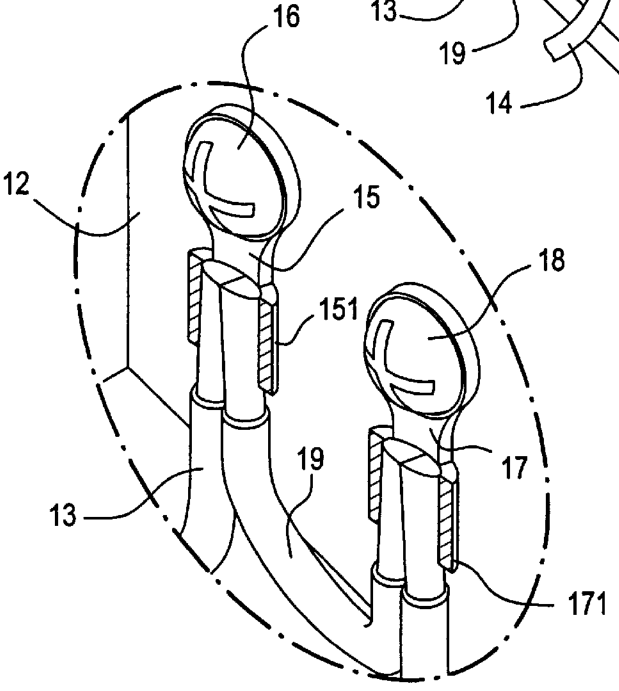
Fig. 1B

ELECTRICAL WIRING CONSTRUCTION INCLUDING A BUS BAR

BACKGROUND OF THE INVENTION

1. Field of Invention

The present invention relates to an electric wiring construction having a bus bar that supplies electricity to one or more electrical components. A first connection terminal is connected with the bus bar by means of a first screw tightened into the bus bar. A second connection terminal is connected with the bus bar by means of a second screw tightened into the bus bar. An input line is connected with the first connection terminal, and an output line that supplies electric current to one or more other electricity-consuming components is connected with the second connection terminal.

2. Description of Related Art

Conventionally, the various electricity-consuming components installed on a vehicle (e.g. a glow plug, heater, or the like) are powered by electricity generated by a generator which is operated by the actuation of the engine. A relay box is provided on an electricity supply path connected with the electricity-consuming components. The relay box accommodates a plurality of relays that switches the supply of electric current to electricity-consuming components, to turn them on and off. FIG. 6 shows a conventional relay box 11. An electrically conductive bus bar 12 is installed on the relay box 11. Relays are electrically connected with the bus bar 12. A part of the bus bar 12 is exposed on an outer surface of the relay box 11. Electricity generated by a generator is transmitted to the relays through an input line 13 and the bus bar 12. The input line 13 is crimped to connect it with a first crimping portion 151 of a first connection terminal 15. The first connection terminal 15 is connected with the bus bar 12 by a first screw 16 tightened into the bus bar 12.

The bus bar 12 that supplies electricity to the relays is also used to supply electricity to other electricity-consuming components other than via the relays. An output line 14 that supplies electricity to the other electricity-consuming components is crimped to connect it with a second crimping portion 171 of a second connection terminal 17. The second connection terminal 17 is connected with the bus bar 12 by a second screw 18 tightened into the bus bar 12.

The electricity generated by the generator is transmitted to the relays accommodated inside the relay box 11 and the output line 14 through the input line 13 and the bus bar 12. That is, through the bus bar 12, electricity is sent to the other electricity-consuming components positioned at the other end of the output line 14. When electricity passes through the bus bar 12, heat is generated by the bus bar 12. The generated heat is transmitted to the first and second connection terminals 15 and 17 and the first and second screws 16 and 18. Owing to the heat transmission, the first and second connection terminals 15 and 17 and the first and second screws 16 and 18 are heated. As described above, the input line 13 is fixed by crimping to the first connection terminal 15, and the output line 14 is fixed by crimping to the second connection terminal 17. When the temperature of the generated heat of the bus bar 12 exceeds the thermal resistance temperature of the first connection terminal 15 and that of the second connection terminal 17, the electrical contact between the input line 13 and the first crimping portion 151 and that between the output line 14 and the second crimping portion 171 become poor.

SUMMARY OF THE INVENTION

It is an object of the present invention to prevent poor electrical contact between a connection terminal and a bus bar.

In order to address the object described above, the present invention provides an electric wiring construction having a bus bar that supplies electricity to one or more electricity-consuming components; a first connection terminal is connected with the bus bar by means of a first screw tightened into the bus bar; a second connection terminal is connected with the bus bar by means of a second screw tightened into the bus bar; an input line is connected to the first connection terminal; and an output line that supplies electric current to one or more other electricity-consuming components is connected to the second connection terminal. The first connection terminal and the second connection terminal are also connected to each other by a bypassing member.

Accordingly, part of the electric current flowing through the input line flows to the output line not via the bus bar but via the bypassing line. This construction allows a smaller amount of electric current to flow through the bus bar than that flowing through a bus bar of the conventional construction.

Preferably, the first connection terminal and the second connection terminal each have a respective crimping portion; one end of the bypassing member and the input line are crimped to the crimping portion of the first connection terminal; and the other end of the bypassing member and the output line are crimped to the crimping portion of the second connection terminal.

For example, it is easy to form a construction in which the bypassing member is crimped to the crimping portion of each connection terminal, together with the input and output lines.

Preferably, one end of the bypassing member is connected with at least one of the first connection terminal and the bus bar by means of the first screw tightened into the bus bar; and the other end of the bypassing member is connected with at least one of the first connection terminal and the bus bar by means of the second screw tightened into the bus bar. That is, both the bypassing member and the connection terminals are connected with the bus bar by tightening the screws into the bus bar. Usually, the bus bar is installed on a relay box accommodating a plurality of relays, and the relays are electrically connected with the bus bar.

BRIEF DESCRIPTION OF THE DRAWINGS

The exemplary embodiments of the invention will be described in detail, with reference to the following figures in which:

FIG. 1 is a perspective view of a first embodiment of the present invention and a partly broken-away enlarged view showing a main portion of the first embodiment;

DETAILED DESCRIPTION OF PREFERRED EMBODIMENTS

Figure 6:
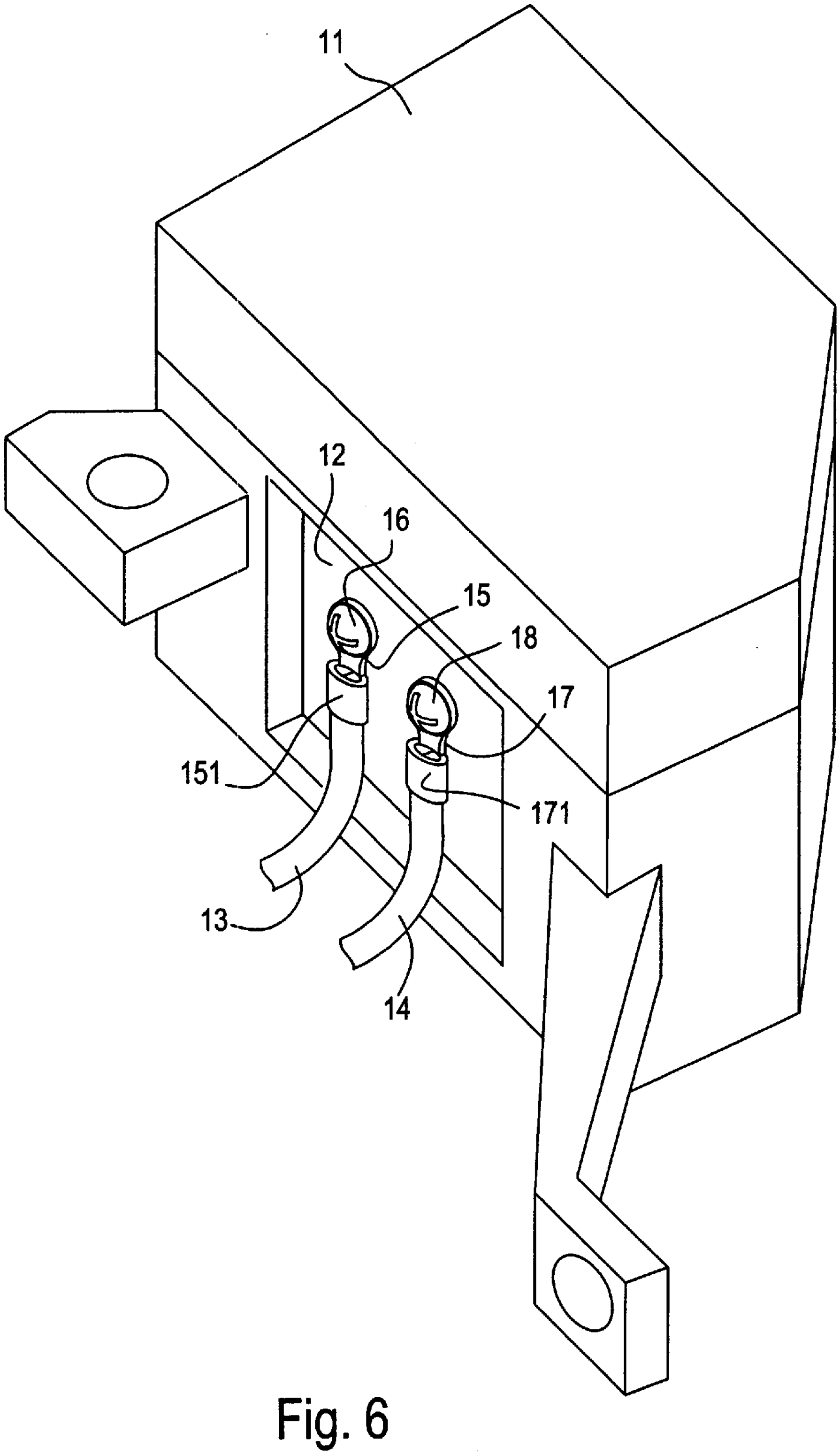
Fig. 6 Prior Art
FIG. 6 is a perspective view of a conventional construction.

A first embodiment of the present invention will be described with reference to FIGS. 1 and 2. Constituent components of the first embodiment which are the same as those shown in FIG. 6 are denoted by the same reference numerals as those used in FIG. 6.

As shown in FIG. 1, an exposed core wire at an end portion of an input line 13 and an exposed core wire at an end portion of an electrically conductive bypassing line 19 are crimped to a first crimping portion 151 of a first connection terminal 15. The terminal 15 is connected with a bus bar 12 by means of a first screw 16 tightened into the bus bar 12. An exposed core wire at an end portion of an output line 14 and an exposed core wire at an end portion of the bypassing line 19 are crimped to a second crimping portion 171 of a second connection terminal 17, which is connected with the bus bar 12 by means of a second screw 18 tightened into the bus bar 12.

Figure 2:
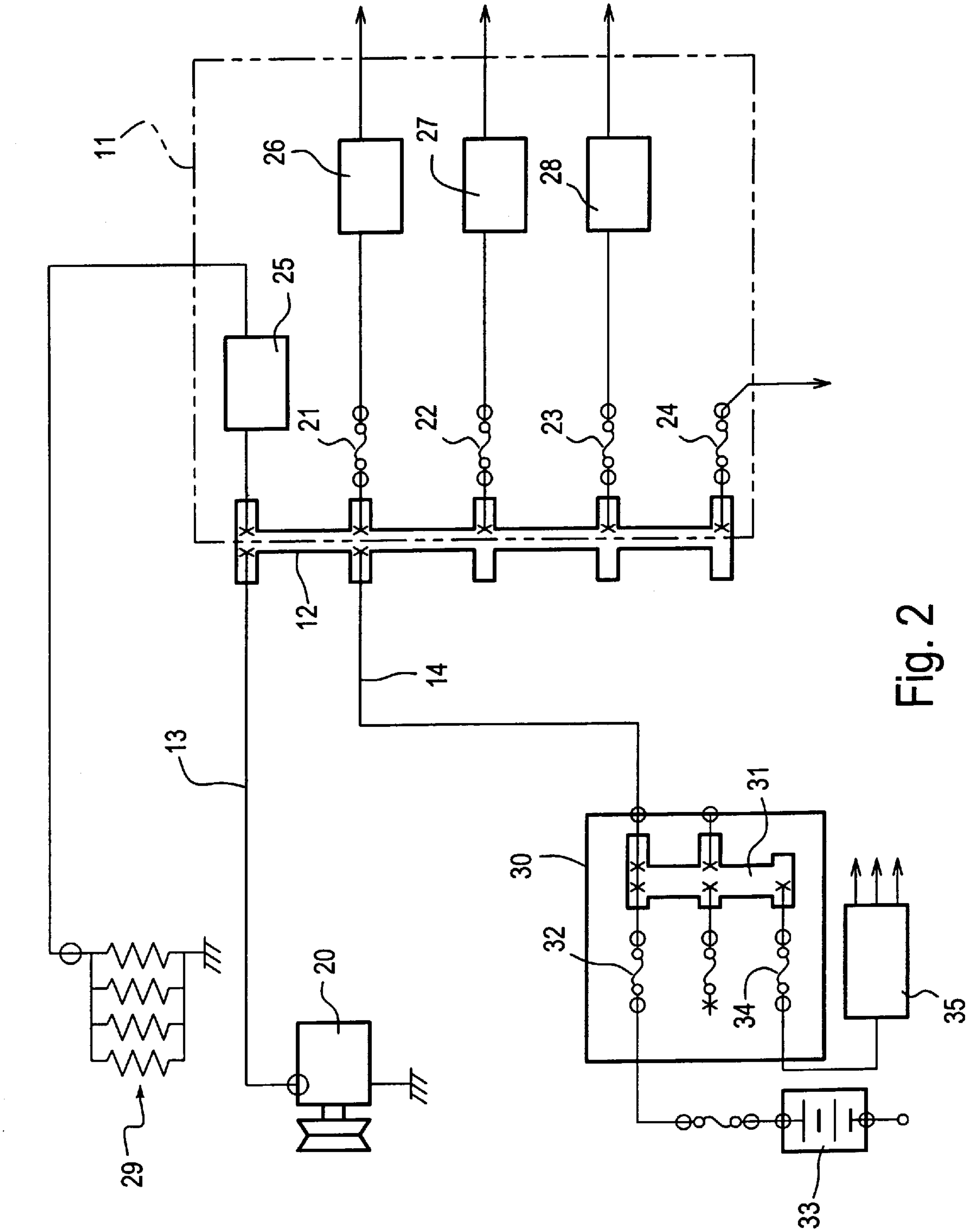
FIG. 2 is a circuit diagram according to the embodiment of FIG. 1.

FIG. 2 shows the wire construction of FIG. 1 connected to a generator 20, which generates electricity by the actuation of the engine of a vehicle for transmission to various electricity-consuming components. A relay box 11 accommodates fuses 21, 22, 23, and 24 and relays 25, 26, 27, and 28. The relay 25 performs switching of electric current supply to a glow plug 29, which is an electricity-consuming component, to turn the glow plug 29 on or off. The relays 26–28 perform switching of electric current supply to a heater (not shown), which is another electricity-consuming component, to turn the heater on or off. The fuse 24 is electrically connected with an electricity-consuming component which is not shown in FIG. 2. The output line 14 is connected with a bus bar 31 accommodated inside a fuse box 30. The bus bar 31 is electrically connected with a battery 33 through a fuse 32. The bus bar 31 is also electrically connected with an electricity distribution part 35 through a fuse 34. The electricity distribution part 35 distributes electric current to various electricity-consuming components.

The following effects are obtained by the invention according to the first embodiment.

1. A part of the electric current flowing through the input line 13 flows to the output line 14, not via the bus bar 12, but via the bypassing line 19. If the bypassing line 19 was not provided, all of electric current which flows through the input line 13 would flow through the bus bar 12. The construction of the present invention allows a lower amount of the electric current to flow through the bus bar 12 than that flowing through the bus bar of the conventional construction. Thus, the heat generated in the bus bar 12 is lower than the heat generated by the bus bar of the conventional construction. Consequently, the temperature increases of the bus bar 12, the first connection terminal 15, the second connection terminal 17, the first screw 16, and the second screw 18 are smaller in the case of the invention according to the first embodiment than in the corresponding members of the conventional construction. Accordingly, it is possible to ensure good electrical contact between the bus bar 12 and the first connection terminal 15, as well as between the bus bar 12 the second connection terminal 17, even though heat is continually generated in the bus bar 12 upon switching electric current to and from the electricity-consuming components.

2. The bypassing line 19 transmits heat transmitted to it. Thus, the temperature of the first connection terminal 15, the second connection terminal 17, the first screw 16, and the second screw 18 can be prevented from becoming too high. The heat transmission of the bypassing line 19 contributes to preventing poor electrical contact between the input line 13 and the first connection terminal 15 and between the output line 14 and the second connection terminal 17.

3. It is very easy to form a construction in which the input line 13 and the bypassing line 19 are crimped together to the first crimping portion 151 of the first connection terminal 15 and the output line 14 and the bypassing line 19 are crimped together to the second crimping portion 171 of the second connection terminal 17. That is, the construction can be formed by merely adding the bypassing line 19 to the conventional construction.

Figure 3:
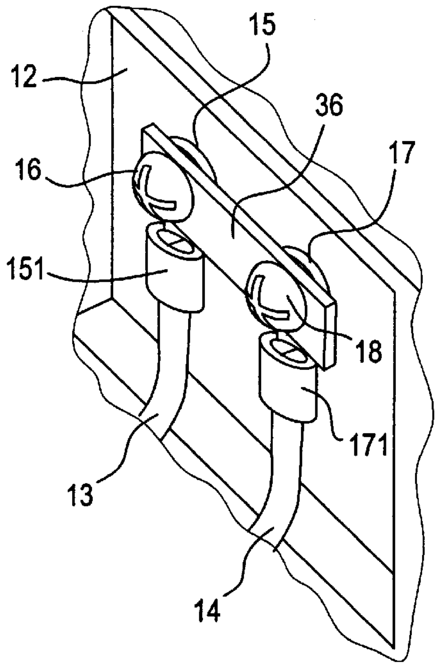
FIG. 3 is a perspective view according to a second embodiment of the present invention.

The second embodiment of the present invention will be described below with reference to FIG. 3. Constituent components of the second embodiment which are the same as those of the first embodiment are denoted by the same reference numerals as those of the first embodiment.

In the second embodiment, a plate-shaped bypassing member 36 and first and second connection terminals 15 and 17 are connected with a bus bar 12 by means of first and second screws 16 and 18 tightened into the bus bar 12. The bypassing member 36 is interposed between the connection terminal 15 and the head of the first screw 16 and between the second connection terminal 17 and the head of the second screw 18. Thus, there is a gap formed between the bus bar 12 and the bypassing member 36.

In the second embodiment, effects similar to those described above in items 1 and 3 are obtained. The heat transmission area of the plate-shaped bypassing member 36 is greater than that of the bypassing line 19 of the first embodiment. Therefore, the bypassing member 36 prevents temperature increases of the bus bar 12, the first connection terminal 15, the second connection terminal 17, the first screw 16, and the second screw 18 more effectively than the bypassing line 19 of the first embodiment.

Figure 4:
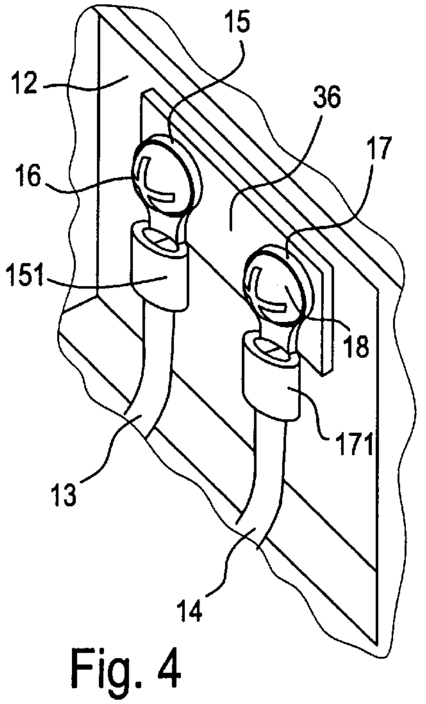
FIG. 4 is a perspective view according to a third embodiment of the present invention.

According to the third embodiment shown in FIG. 4, a bypassing member 36 is interposed between a bus bar 12 and a first connection terminal 15 and between the bus bar 12 and a second connection terminal 17.

Figure 5:
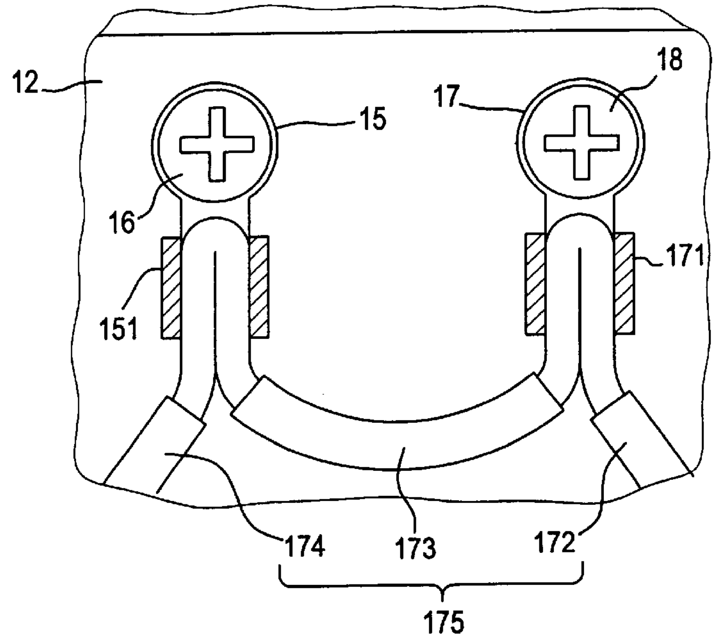
FIG. 5 is a partly broken-away front view according to a fourth embodiment of the present invention.

The fourth embodiment of the present invention is described below with reference to FIG. 5. Constituent parts of the fourth embodiment which are the same as those of the first embodiment are denoted by the same reference numerals as those of the first embodiment.

In the fourth embodiment, an input line 174, an output line 172, and a bypassing line 173 are formed integrally with one another to form a lead wire 175. A core wire of the lead wire 175, exposed by removing the covering of the lead wire 175, is crimped to first and second crimping portions 151 and 171.

The fourth embodiment provides effects similar to those of the first embodiment.

Further embodiments of the present invention may be obtained by adapting the first to fourth embodiments in one or both of the following ways:

(1) Forming the bypassing member integrally with the bus bar 12.

(2) Forming a heat release fin on the bypassing member to increase the heat release area.

As described above, because the first connection terminal and the second connection terminal are connected with each other by the bypassing member, the present invention ensures good electrical contact between the connection terminals and the bus bar.

While the invention has been described in conjunction with preferred embodiments as described above, it is evident that many alternatives, modifications and variations will be apparent to those skilled in the art. Accordingly, the preferred embodiments in the invention set forth above are intended to be illustrative and not limiting. Various changes may be made without departing from the spirit and scope of the invention.

What is claimed is:

1. An electric wiring structure for use with at least one electrical component, comprising:

a bus bar that supplies electricity to the at least one electrical component;

a first fastener;

a second fastener;

a first connection terminal connected to the bus bar by the first fastener which is tightened into the bus bar;

a second connection terminal connected to the bus bar the second fastener which is tightened into the bus bar;

an input line connected to the first connection terminal;

an output line that supplies electric current to the at least one electrical component, the output line being connected to the second connection terminal; and a by-passing member connecting the first connection terminal with the second connection terminal;

wherein the bypassing member conducts a first portion of the electric current between the first and second connection terminals while a second portion of the electric current flows through the bus bar.

2. The electric wiring structure according to claim 1, wherein the first connection terminal and the second connection terminal each have a crimping portion, one end of the bypassing member and one end of the input line are crimped to the crimping portion of the first connection terminal, and another end of the bypassing member and one end of the output line are crimped to the crimping portion of the second connection terminal.

3. The electric wiring structure according to claim 1, wherein one end of the bypassing member is connected to at least one of said first connection terminal and the bus bar by the first fastener; and the other end of the bypassing member is connected to at least one of the second connection terminal and the bus bar by the second fastener.

4. The electric wiring structure according to claim 1, wherein the bus bar is installed on a relay box accommodating a plurality of relays and the relays are electrically connected with the bus bar.

5. The electric wiring structure according to claim 1, wherein the first and second fasteners are screws.

6. The electric wiring structure according to claim 1, wherein the bypassing member is a wire.

7. The electric wiring structure according to claim 1, wherein the bypassing member has a plate shape.

8. The electric wiring structure according to claim 1, wherein the bypassing member transmits heat and reduces heating of the bus bar.

* * * * *